United States Patent
Lind

[11] 3,884,069
[45] May 20, 1975

[54] TRANSDUCER FOR A FLOW GAUGE

[75] Inventor: Per Ingemar Arnold Lind, Sollentuna, Sweden

[73] Assignee: Svenska Utvecklings AB (SUAB), Swedish National Development Co., Sweden

[22] Filed: Apr. 17, 1973

[21] Appl. No.: 351,826

[30] Foreign Application Priority Data
Apr. 21, 1972  Sweden.............................. 5321/72
Apr. 21, 1972  Sweden.............................. 5322/72

[52] U.S. Cl................ 73/194 C; 73/194 E; 73/229
[51] Int. Cl............................. G01f 1/02; G01f 1/06
[58] Field of Search...... 73/194 R, 194 C, 229, 253, 73/255, 194 B, 194 E

[56] References Cited
UNITED STATES PATENTS

| 2,518,149 | 8/1950 | Kearsley | 73/255 UX |
| 3,144,768 | 8/1964 | Gehre | 73/229 X |
| 3,381,531 | 5/1968 | Arutjunov et al. | 73/255 X |
| 3,443,432 | 5/1969 | Shonin et al. | 73/255 X |
| 3,447,373 | 6/1969 | McNabb | 73/253 X |
| 3,504,987 | 4/1970 | Dee | 73/231 X |

FOREIGN PATENTS OR APPLICATIONS
529,615  11/1940  United Kingdom.................. 73/229

*Primary Examiner*—James J. Gill
*Attorney, Agent, or Firm*—Toren, McGeady and Stanger

[57] ABSTRACT

A flow-meter comprises a housing which contains a rotary body. The swirling movement of the fluid in the housing makes the body rotate, and the rotation represents the flow volume. The accurateness of the flow-meter is improved if the kinetic energy of the swirling fluid is converted into pressure energy when the fluid leaves the housing.

28 Claims, 24 Drawing Figures

TRANSDUCER FOR A FLOW GAUGE

The invention relates to a transducer for a flow gauge of the type comprising a housing consisting of an inlet part having at least one inlet channel, positioned tangentially, by means of which fluid entering the housing is brought to swirl, an outlet part for the fluid and a rotary body arranged in the housing, said body being caused to rotate by the swirling fluid so that the rotation represents the flow volume. The rotary body may be in the form of a ball or of two or more blades fitted radially on a shaft. A transducer of this type is combined with a tachometer which counts the number of revolutions made by the rotary body, from which the flow volume can be calculated. The transducer may be used for both liquids and gases.

Known transducers of this type have a number of drawbacks. One is the difficulty in obtaining a linear ratio between the flow volume and the speed of rotation of the body. Furthermore, the speed of the rotary body has often altered from revolution to revolution. The pressure drop in the transducer is often too great and disturbing swirling currents often occur in pipe sections down stream from the outlet of the transducer. The object of the invention is to provide a transducer which will eliminate or reduce these disadvantages. The invention aims particularly at providing a transducer which operates with a low pressure drop.

According to one embodiment the transducer according to the invention is characterized in that the distance $R_i$ from the centre line of the inlet channel to the centre of the outlet part is defined by the formula:

$$0.9(w/2 + 2r_b + r_d) < R_i < 1.1(w/2 + 2r_b + r_d)$$

where $w$ is the width of the inlet channel, $r_d$ is the smallest radius of the outlet channel and $r_b$ is the radius of the rotary body when this is in the form of a ball.

With the stated distance $R_i$, a maximum of linearity is gained, and also a minimum of pressure drop over the inlet part. Another embodiment of the invention is characterized in that the outlet part is designed so that the kinetic energy in the swirling current is converted to pressure energy. The outlet part is designed either with at least one substantially tangentially positioned outlet channel, or with guide vanes of a special shape together with an axial outlet channel. This conversion of kinetic energy to pressure energy reduces the pressure loss in the transducer. The flow of the fluid in the pipe after the transducer progresses substantially without swirling.

The desired linear ratio between the flow volume of the fluid and the rotary speed of the body is particularly difficult to achieve with certain values of the Reynolds' number, Re, which denotes the ratio between dynamic and viscous force in the flowing fluid. This is particularly the case when Re, based on the diameter $d_i$ of the inlet channel, is of the same magnitude as a "critical Reynolds' number" = 2,000

$Re_{d_i} = \bar{V}_i\, d_i/\gamma$ where $\bar{V}_i$ is the average speed in the inlet $\bar{V}_i = Q/A_i$ where $A_i$ is the total inlet area. $d_i$ is obtained from $d_i = 2(A_i/\pi)^{1/2}$.

In a transducer according to the invention, intended for $Re_i \leq 2,000$, the inlet part should have several inlet channels, preferably at least two, the length of these channels being short and their cross-sections decreasing in the direction of the inlet. The channels are supplied from an annular channel with large cross-sectional area.

As already mentioned, the rotary body consists either of a sphere or of a shaft having at least two flat blades. If a sphere is selected, the roof and floor of the inlet part are provided with tracks which permit kinematically correct journalling of the ball. Fluids having solid particles dispersed in them jeopardize the length of life of the ball and the journalling tracks. In this case the rotary body should have the shape of a shaft having at least two rectangular blades, the shaft being arranged to rotate about a symmetry axis through the central axis of the transducer. In the first formula above $r_b$ is then equal to 0. The blades may be turned so that they offer the least possible resistance to the flow.

The transducer according to the invention permits a precision measurement with a maximum deviation of 1 % of the maximum flow from the linear ratio between rotation frequency and flow volume.

In the following the invention will be further described with reference to the accompanying drawings.

Figure 1:
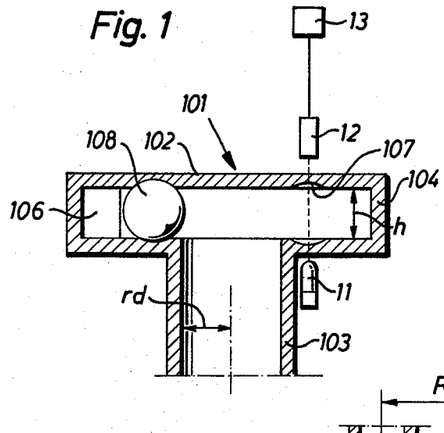
FIG. 1 shows a diametric section through a transducer according to the invention.
Figure 2:
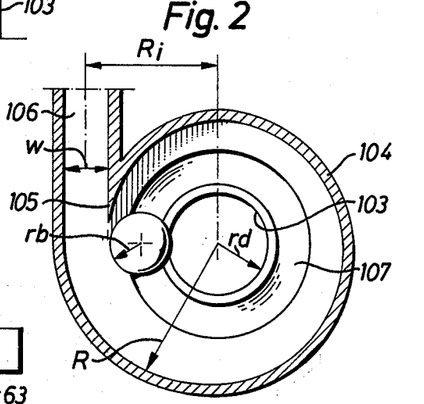
FIG. 2 shows a section through the inlet part of the transducer according to FIG. 1.

The transducer according to FIGS. 1 and 2 comprises a housing 101 consisting of two main parts, namely an inlet part 102 and an outlet part 103. The side wall 104 of the inlet part is helical and is connected to an inlet channel 106 having rectangular cross section, which extends tangentially in relation to the inlet part. The part of the helical wall 104 having the smallest radius is extended to form a lip 105. The upper and lower walls of the inlet part, which are parallel to each other, are arranged with concentric grooves 107 which form a circular track for a ball 108. The ball track is big enough for the ball 108 to rotate freely with slight clearance from the lip 105. In the lower wall of the inlet part an opening is arranged, concentric with the groove, to which the upper end of the outlet part is connected.

When in use, the transducer is combined with a tachometer which counts the number of revolutions performed by the ball 108. If the inlet part 102 consists of transparent material or is provided with a transparent window, the tachometer may consist of a light source 11, a photo-tube 12, and a counter 13, actuated by the photo-tube each time the light from the light source to the photo-tube 12 is interrupted by the ball 108. If the ratio between the flow volume and the frequency of the ball is linear, the result indicated by the counter 13 will directly represent the volume of fluid which has flowed through the transducer.

The inlet channel 106 has rectangular cross section with a width $w$ and a height $h$ which is equal to the height h of the inlet part. The inlet area $A_i$ is then $$A_i = h \cdot w$$

$w$ should be approximately the same size as $h$.

It is easier to obtain a linear ratio between flow volume and ball frequency if the ball track is placed as close to the edge of the intermediate part as possible. The pressure field created by the accelerating throughflow may then have a favourable influence on the flow along the floor of the inlet part and also on the flow around the ball 108 (so-called "lowering affect"). The ball "cavity" will therefore be closed, which is advantageous from the point of view of pressure losses.

The pressure drop $\Delta p_k$ over the inlet part is defined by the following formula, which is strictly true for the case $Re_i \to \infty$ $$\Delta p_k = K \cdot q_i \left[(R_i/r_d)^2 - 1\right]$$

where $q_i$ is the dynamic pressure in the inlet part 102, $R_i$ is the radius from the centre of the outlet part to the axis of the inlet channel 106 and $r_d$ is the smallest radius of the outlet part 103. $K$ is a proportionality constant. It is clear from the formula that a minimum of pressure drop is obtained if $R_i$ is as small as possible.

If the radius of the helical inlet chamber is designated $R_k$, then an angle alteration $d\theta$ will result in a radius alteration $dR_k$:

$$dR_k = a \cdot R_k^n \cdot d\theta$$

in which $n$ is a constant, preferably having the value 2, and $a$ is defined by the fact that $$\int_0^{2\pi} dR$$

shall be equal to the width of the inlet channel 106.

The helical shape ensures a concentric flow field in the inlet part, which is favourable from the point of view of wear on the rotary body and its bearing.

The following formula defines the ratio between the width $w$ of the inlet channel 106, the radius $rb$ of the ball 108, the smallest radius $r_d$ of the outlet part 103 and the distance $R_i$ from the centre line of the inlet channel 106 to the centre of the outlet part 103:

$0.9(w/2 + 2r_b + r_d) < R_i < 1.1(w/2 + 2r_b + r_d)$ If $R_i$ lies outside the value defined by the formula, the flow resistance in the transducer will be impermissibly high, or the ratio between the rotation frequency of the ball and the flow volume will deviate too much from the desired linear relation.

The highest value of the radius $r_d$ of the outlet part 103 is defined by the fact that a sufficient "lowering effect" shall be obtained. This means that $r_d$ shall be less than twice the height $h$. The minimum tolerable area of the outlet part 103 is determined by the fact that $\Delta p_k$ (see above) must be limited. Preferably, therefore, the ratio between $r_d$ and $h$ is determined by the formula $$0.8 < (r_d/h) < 1.2$$

Figure 3:
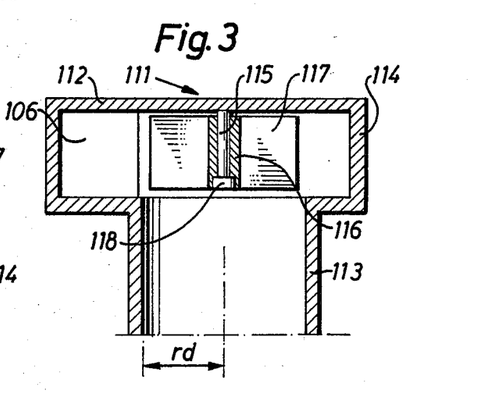
FIG. 3 shows a diametric section another embodiment through the inlet the transducer according to the invention.
Figure 4:
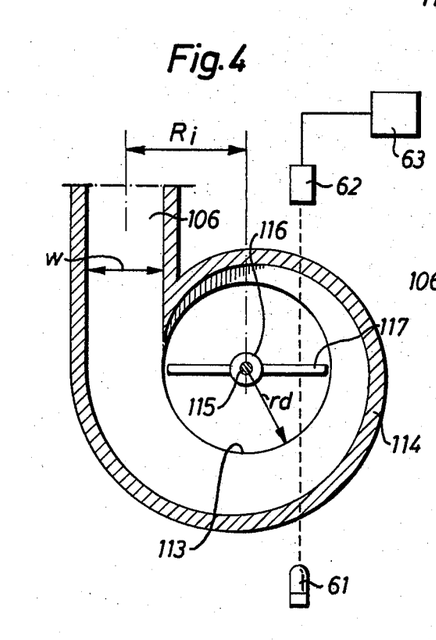
FIG. 4 shows a section through the inlet part of the transducer according to FIG. 3.

The transducer according to FIGS. 3 and 4 comprises a housing 111 consisting of an inlet part 112 with helical side wall 114 and tangential inlet channel 106 and an axially positioned outlet part 113. In the upper wall of the inlet part 112, coaxial with the outlet part, is a post 115 having an enlarged lower part 118. The post 115 supports a tubular shaft 116 for two flat blades 117 placed diametrically.

The swirling movement of the fluid in the inlet part 112 sets the rotary body 116, 117 in rotation with a frequency corresponding to the flow volume. The number of revolutions performed by the rotary body is measured in known manner, for example with the help of a light source 61 and a photo-tube 62 activating a tachometer 63. The side wall of the inlet part may be transparent altogether or may be provided with a window.

In order to obtain satisfactory linearity and low pressure drop, the relationship between the distance $R_i$ from the centre line of the rectangular inlet channel 106 to the centre of the outlet part 113, the width $w$ of the inlet channel and the smallest radius of the outlet part 113, should satisfy the equation:

$$0.9(w/2 + r_d) < R_i < 1.1(w/2 + r_d).$$

This equation does not refer to $r_b$, since $r_b = 0$ when blades are used instead of a ball.

The relationship between the height of the inlet part and the radius of the outlet part should satisfy the equation given in connection with the description of FIGS. 1 and 2.

In the embodiments according to FIGS. 1–4 there will be vigorous swirling of the fluid at the outlet 103, 113. This causes a pressure loss and possibly disturbs instruments and apparatus located further on in the pipe for the fluid. An improvement is obtained if four straight guide vane plates 123, each directly radially, are placed in the outlet channel 122 connected to the bottom 121 of the inlet part, see FIGS. 5–6. However, the retardation of the swirling currents against the plates 123 causes a certain pressure loss.

Figures 5, 6, 7, 8, 9:
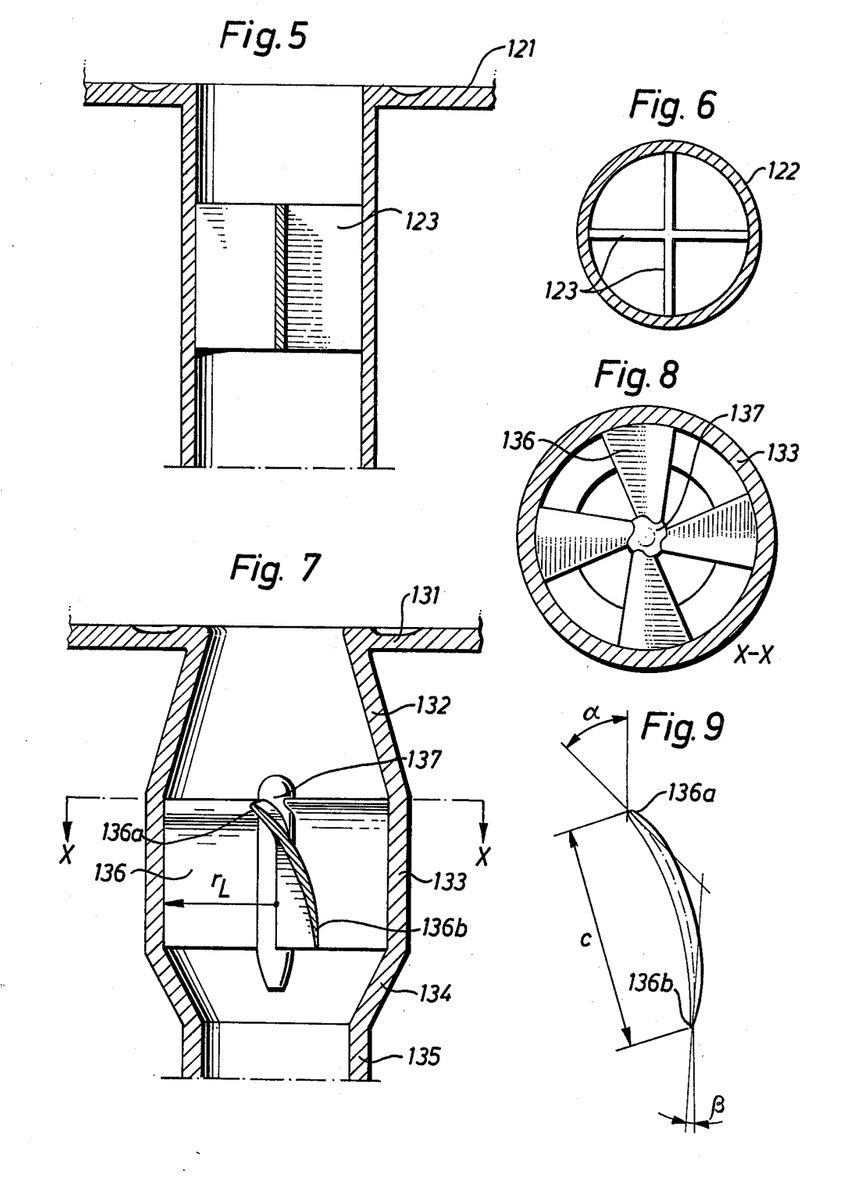
FIG. 5 shows a diametric section through the outlet part of a transducedr according to the invention.
FIG. 6 shows a section through the outlet part of a transducer according to FIG. 5.
FIG. 7 shows a diametric section through the outlet part of a transducer according to the invention.
FIG. 8 shows a section through the outlet part according to FIG. 7.
FIG. 9 shows on an enlarged scale a detail from FIG. 7.

Better pressure recovery is obtained with the help of the arrangement according to FIGS. 7–9. An outlet part consisting of a part 132 which expands conically, a cylindrical part 133, a part 134 which decreases conically, and a cylindrical part 135 having the same radius as the opening at the bottom 131 of the inlet part is connected to the outlet opening in the bottom 131 of the inlet part. Four guide vanes 136 are arranged in the cylindrical part 133. These are attached by their outer ends to the clindrical part 133 and by their inner ends to a central rod 137. The guide vanes 136 are curved so that the upper part 136a is approximately parallel to the flow direction of the fluid entering and the lower part 136b is approximately parallel to the axial direction of the outlet part. More specifically, the curving should be such that the tangent angles $\alpha$ and $\beta$, see FIG. 9, acquire approximately the following values:

$\alpha = 1.25 \cdot \text{arctg}(\pi \cdot R_i \cdot r_L/A_i)$
$\beta = 3°$ $R_i$ and $A_i$ represent the same as previously. The radius $r_L$ is the radius of the cylindrical part 133. The front edge of the guide vanes is rounded, suitably with the radius $0.01 \cdot c$, where $c$ is the length of the guide vane.

Figures 10, 11, 12, 14:
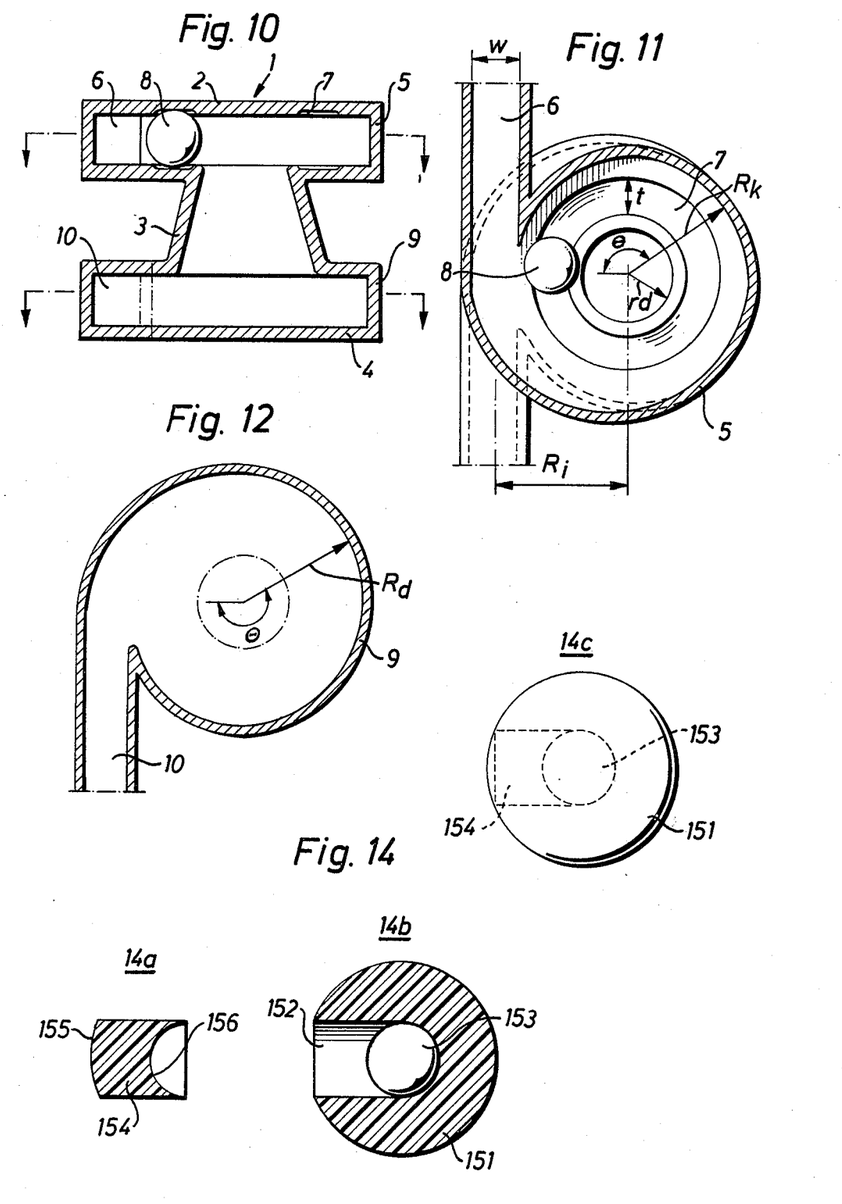
FIG. 10 shows a diametric section through one embodiment of the transducer according to the invention.
FIG. 11 shows a section through the inlet part of the transducer according to FIG. 10.
FIG. 12 shows a section through the outlet part of the transducer according to FIG. 10.
FIG. 14 shows how a rotary body in the form of a plastic ball can be provided with a core of metal.

The transducer according to FIGS. 10–12 is intended for cases when $Re_i$ is considerable greater than 2,000. The transducer comprises a housing 1 consisting of three main sections, namely an inlet part 2, an intermediate part 3 and an outlet part 4. The side wall 5 of the inlet part is helical and is connected to an inlet channel 6 having rectangular cross section, which extends tangentially in relation to the inlet part. Concentric grooves 7 forming a circular track for a ball 8 are arranged in the upper and lower walls of the inlet part, these walls being parallel to each other. In the lower wall of the inlet part an opening is arranged concentric with the groove 7, to which the upper end of the intermediate part 3 is connected. The lower end of the intermediate part is connected to an opening in the upper wall of the outlet part 4.

The side wall 9 of the outlet part 4 is also helical and is provided with an outlet channel 10 having rectangular cross section and extending tangentially with respect to the outlet part. The inlet channel 6 and outlet channel 10 are preferably parallel so that the transducer can be connected in a straight pipe fitting.

The transducer is combined with a tachometer, for example of the type described in connection with FIG. 1.

The swirling movement produced in the inlet part 2 is converted to pressure energy in the outlet part 4 and the fluid leaves the transducer through the tangential outlet channel 10 without noticeable pressure loss and without swirling. The side wall of the outlet part is given the same helical shape as the inlet part in order to give good flow symmetry. The outlet channel 10 is given an area $A_u$ determined by $R_u$ and having an average swirling strength $\Gamma$ in the outlet part:

$A_u = A_i \cdot (\Gamma_o/\Gamma) \cdot (R_u/R_i)$ $\Gamma_o$ is the original swirling stength:
$\Gamma_o = 2\pi R_i \overline{V}_i$
$0 < \Gamma/\Gamma_o < 1$ The exact value of $\Gamma/\Gamma_o$ depends on the detail geometry of the transducer and on the Reynolds number. It is of importance for the linearity at low flow speeds that $A_u$ is the correct size.

In the transducer according to FIGS. 1–3, the inlet part has been placed at a distance from the outlet part so that the light source 11 can be placed between these two parts. If the tachometer operates in any other way, for example by means of magnetic indication of the ball, so that the inlet part need not have a transparent wall, then the inlet part can be placed immediately next to the outlet part.

When the rotary body is a sphere, the groove for the sphere may be in the form of circle arcs having a radius slightly greater than that of the ball. However, it has been found that, for example, an irregularity in the flow of the fluid easily causes the ball to bounce between its two outer positions in the groove. A smoother movement of the ball is achieved with the cross-sectional shape of the groove shown in FIG. 13. The groove is in the form of two circle arcs 141, 142 separated by a straight section 143. The radius $r_t$ of the arcs is about 10% larger than the radius $r_b$ of the ball 144 and takes up a sector $\phi_t$ which is 20°–30°. The distance between the grooves is such that a clearance s exists between the ball and the groove. For satisfactory abutment the clearance should be $s = 0.2 \, r_b(1 - \cos \phi_t)$ The ball will then touch the arc at its end point, which is favourable from the point of view of wear on the ball. When the fluid flows through the inlet part and forces the ball round the track, the ball will load either pair of points 15, 16 or 17, 18 because of its density in relation to the density of the fluid. The connection lines between the pairs of points are perpendicular to the plane of the track, and the ball will therefore roll with its spinning axis in the same direction without any friction force occurring. This is the only spinning axis which does not require a torque in order to maintain its direction.

The density of the ball should be selected so that the difference density $\Delta\rho$ is approximately $(\Delta\rho/\rho_m) = (\rho_k - \rho_m/\rho_m) = \pm 0.1$ The index $k$ indicates the ball and $m$ indicates the fluid.

This ensures good linearity since the load of the ball on the journalling track is low but still sufficient to avoid bouncing between the outer and inner pairs of points.

Figure 13:
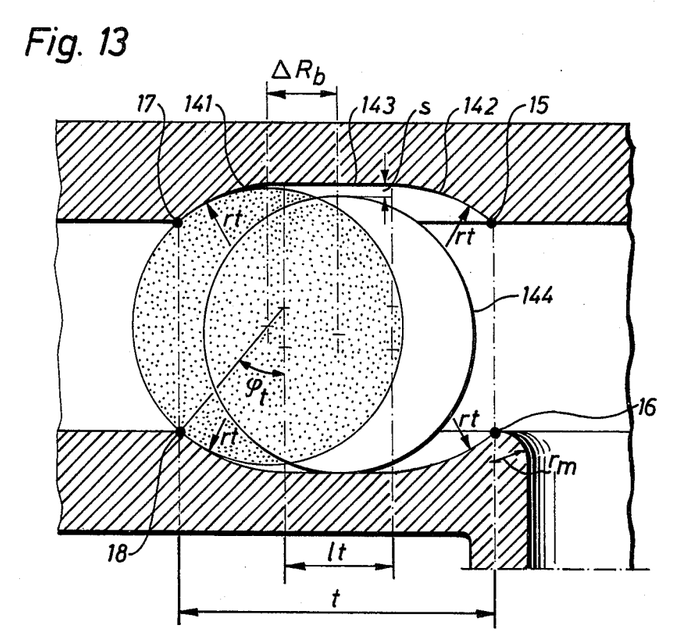
FIG. 13 shows a preferred embodiment of the track for a spherical rotary body.

If the ball track has the cross section shown in FIG. 13, then the following is valid for $R_i$:

$R_i > 0.9 \, (w/2 + r_b + \Delta R_b + t/2 + r_m + r_d + \Delta R)$
$R_i < 1.1(w/2 + r_b + \Delta R_b + t/2 + r_m + r_d + \Delta P)$ $\Delta R_b$ is the diaplacement of the centre of the ball from the centre of the groove to one or other of the two stable rotation positions, $t$ is the total width of the ball track, $r_m$ is the radius of curvature for the edge between the ball track and the axially directed outlet channel for the fluid, and $\Delta R$ is the slight clearance required between the ball and the helical side wall of the inlet part at the point where the radius is smallest. The above definition of $R_i$ is more precise than the approximative definition given in connection with the description of FIGS. 1 and 2.

In order to adjust the density of the ball to that of the fluid, the central parts of the ball may be filled with suitable material to modify the density to the desired value. FIG. 14 illustrates how this can be done. A plastic ball 151 according to FIG. 14b has been provided with a drilled hole 152 and a steel ball 153 has been placed in the cavity in the middle of the plastic ball. A cylindrical plastic plug 154 according to FIG. 14a, having an end surface 155 with the same curvature as the surface of the plastic ball and an end surface 156 having the same curvature as the surface of the steel ball is inserted in the drilled hole 152 and kept there by means of glueing, for example.

Figures 15, 16:
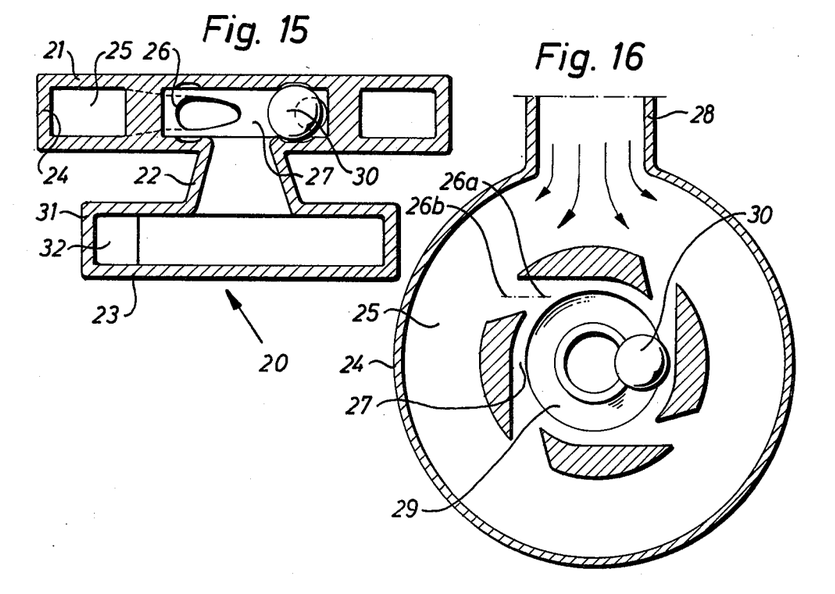
FIG. 15 shows a diametric section through another embodiment of the transducer according to the invention.
FIG. 16 shows a section through the inlet part of the transducer according to FIG. 15.

The transducer according to FIGS. 15 and 16 is intended for when $Re_1$ is around 2,000 or lower than 2,000. The transducer comprises a housing 20 which consists of an inlet part 21, an intermediate part 22 and an outlet part 23. The inlet part 21 has a circular side wall 24 which is connected to an inlet channel 28. The inlet part includes an annular channel 25 supplied from the inlet channel 28 and a central chamber 27 supplied from the channel 25 through four openings 26 extending tangentially in relation to the chamber 27. Each opening has an outer, conically narrowing section 26b and an inner, straight, cylindrical part 26a. This straight cylindrical part 26a should have a length which is less than its diameter. A groove 29 is arranged in the chamber 27, for a rotary body in the form of a ball 30.

The outlet part 23 has a helical side wall 31 and is connected to a tangential outlet channel 32 for pressure recovery, in the same way as has been described in connection with FIGS. 10 –12.

Figure 17:
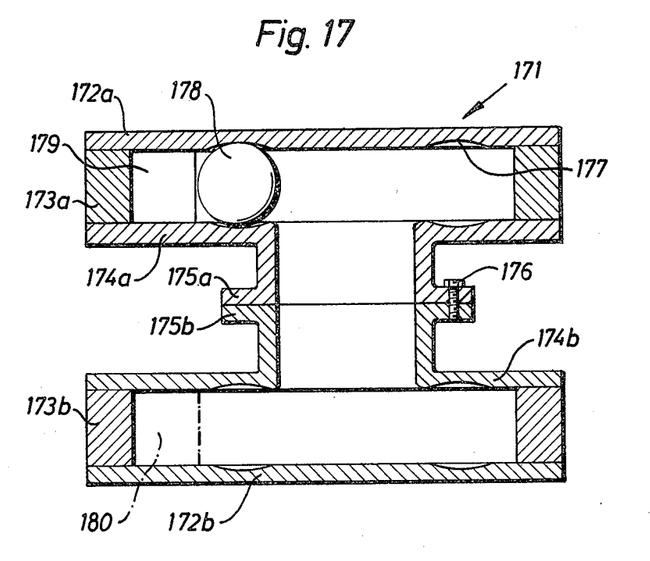
FIG. 17 shows another embodiment of the transducer according to the invention.

FIG. 17 shows an embodiment of the transducer which is intended to reduce the manufacturing costs. The housing 171 of the transducer consists of six parts, namely a lid 172a, a bottom 172b, two helical side walls 173a, 173b which form an inlet channel 179 and an outlet channel 180, and two intermediate parts 174a, 174b which are provided with flanges 175a, 175b, which are fitted together by means of screws 176. Since the upper and lower parts are symmetrical, the housing consists of only three different parts. The lid, bottom and intermediate parts are provided with grooves 177 forming ball tracks, but a ball 178 is inserted only in the half of the housing which is to form the inlet part for the fluid.

Figure 18:
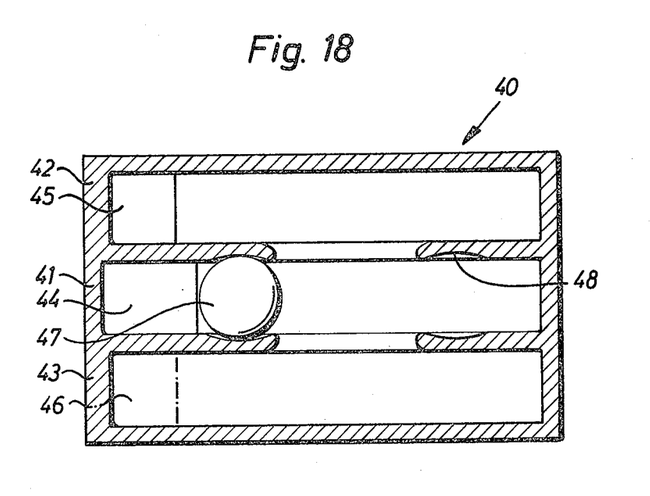
FIG. 18 shows yet another embodiment of the transducer according to the invention.

The transducer according to FIG. 18 comprises a housing 40 consisting of an inlet part 41 and outlet parts 42 and 43 located on each side of the inlet part. The inlet part 41 is helical and provided with tangential inlet channel 44 so that fluid entering is forced into a swirling movement and sets a ball 47 in rotation in an annular groove 48. The fluid flows through central openings in the two parallel walls of the inlet part and pressure is recovered since the two helical outlet parts 42, 43 are provided with tangential outlets 45, 46. The transducer permits twice as much flow for the same pressure drop as the transducer according to FIGS. 1 –3 if the inlet channel 44 is given a cross-sectional area equal to double the inlet area of the transducer according to FIG. 10.

Figure 19:
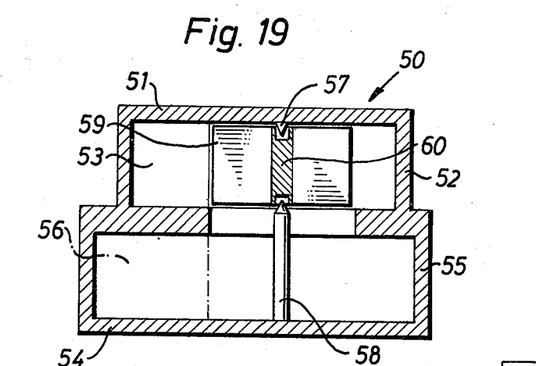
FIG. 19 shows a diametric section through a transducer in which the rotary body consists of a shaft with blades.
Figures 20, 21:
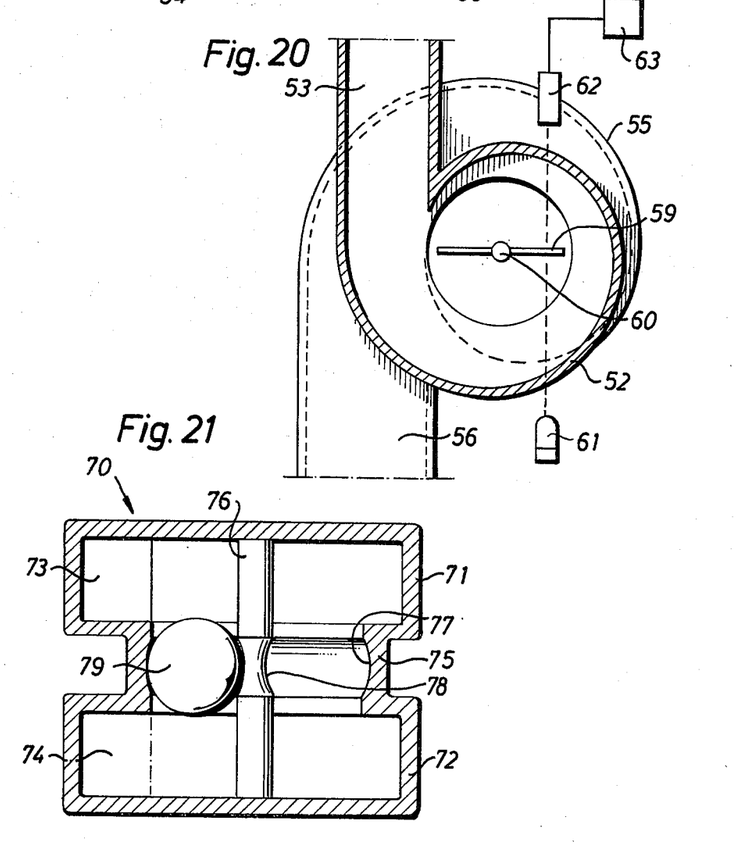
FIG. 20 shows a section through the inlet part of the transducer according to FIG. 19.
FIGS. 21 and 22 show diametric sections through two additional embodiments of the transducer according to the invention.

The transducer according to FIGS. 19 and 20 comprises a housing 50 consisting of an inlet part 51 with a helical side wall 52, which is connected to an inlet channel 53, and an outlet part 54, also having a helical side wall 55, which is connected to an outlet channel 56. In the inlet part, coaxially with the opening of the outlet part, a rotary body in the form of a shaft 60 is arranged having two diametrically positioned flat blades 59. The shaft 60 is supported by a bearing in the form of an upper needle 57 fitted in the upper wall of the inlet part and a lower needle 58 fitted in the lower wall of the outlet part.

The rotary body 59, 60 is set in rotation by the swirling movement in the inlet part 51 and pressure is recovered in the outlet part 54. The rotation frequency is measured by a device 61 –63 which is described in connection with FIGS. 3 –4.

Figure 22:
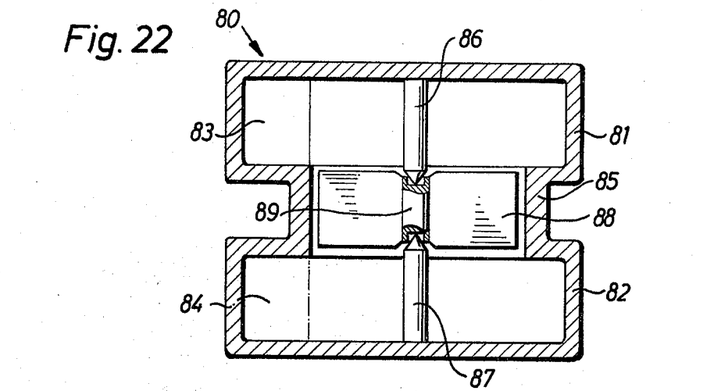

FIGS. 21 and 22 show two embodiments which are constructed completely symmetrically so that the transducer has exactly the same characteristic which ever way the fluid is flowing.

The transducer according to FIG. 21 comprises a housing 70 consisting of a helical inlet section 71 with a tangential inlet channel 73, a helical outlet part 72 with a tangential outlet channel 74, and a cylindrical intermediate part 75 which forms a connection between the inlet part and the outlet part. Coaxial with the intermediate part 75 is a cylindrical post 76. Half way up the post is an annular groove 78. An annular groove 77 is also arranged in the inner wall of the intermediate part. Together, these grooves provide a track for a spherical rotary body 79. The ball 79 should have higher density than the fluid for which the transducer is intended. The ball will then run steadily in the outer groove 77 with its spinning axis perpendicular to the plane of rotation.

The transducer according to FIG. 22 comprises a housing 80 consisting of a helical inlet part 81 with a tangential inlet channel 83, a helical outlet part 82 with a tangential outlet channel 84 and a cylindrical intermediate part 85. A rotary body is arranged centrally in the intermediate part 85, in the form of a shaft 89 having two flat blades 88 arranged diametrically opposite each other. The shaft 89 is supported by a bearing in the form of an upper pin 86 and a lower pin 87.

Figure 23:
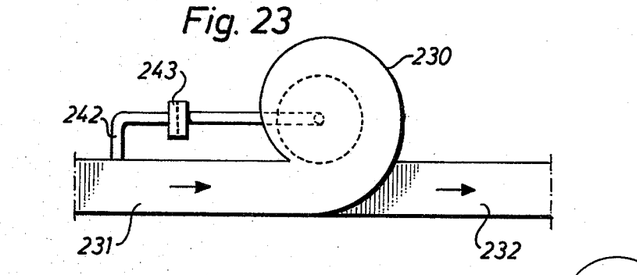
FIGS. 23 and 24 show yet another embodiment.
Figure 24:
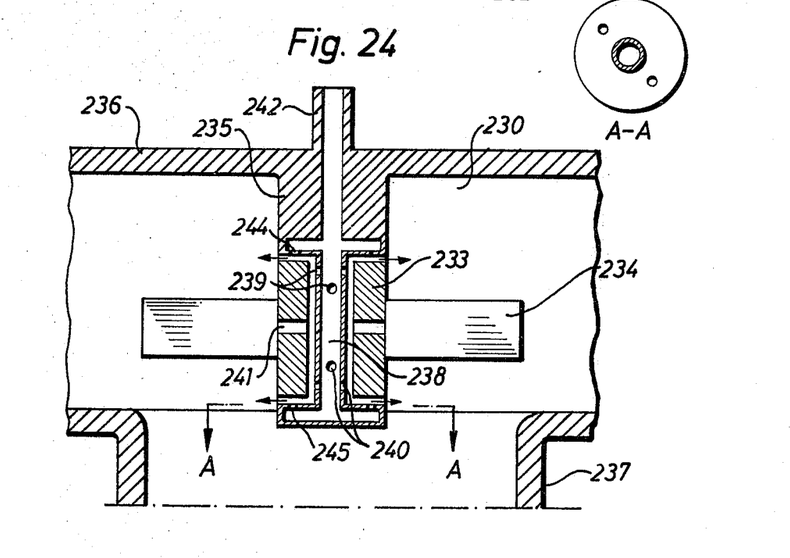

FIGS. 23 and 24 show a transducer with blades in which the rotary body has been designed with a special type of lubricating means. The transducer consists of a helical inlet part 230 which is connected to an inlet pipe 231, a helical outlet part, not shown, which is connected to an outlet pipe 232, and a communicating part 237 between the inlet and the outlet part. In the inlet section is a rotary body in the form of two flat blades 234 mounted on a tubular shaft 233. The shaft 233 is provided with radially directed openings 241 through its wall about half way along. The shaft 233 is mounted on a holder 235 attached to the roof 236 of the inlet part. The holder has a recess for the shaft 233. A longitudinal channel 238 is arranged in the holder, this channel being provided with radially directed openings 239, 240 at the top and bottom in the part of the holder which is provided with a recess for the shaft 233. The channel 238 is also arranged to communicate with openings 244, 245 in the end walls formed by the recess for the shaft 233. The channel 238 is connected to one end of a pipe 242, the other end of which is connected to the inlet pipe 231. A filter 243 may be arranged in the conduit 242.

Because of the pressure difference between the inlet pipe 231 and the outlet part 230, fluid will flow through the conduit 242, the channel 238 and openings 239, 240, 244 and 245 out into the gap between the holder 235 and the shaft 233, thus acting as lubricant. Depending on the location, size, etc. of the openings, either a conventionally lubricated sliding bearing or a purely hydrodynamic bearing can be arranged. If the fluid is polluted, the filter 243 is connected so that the fluid reaching the rotary body as lubricant will be free from particles.

What is claimed is:

1. Transducer for a flow gauge comprising a housing, said housing comprising an inlet part having a central axis, all means connected to said inlet part spaced radially outwardly from the central axis for introducing fluid tangentially into said inlet part so that a swirling action is commenced therein, said inlet part arranged to maintain the swirling action of the fluid introduced through said wall means, an outlet part in fluid communication with said inlet part, said outlet part having a central axis disposed in axial alignment with the central axis of said inlet part, said outlet part arranged to maintain the swirling action of the fluid commenced and maintained in said inlet part, a rotary body positioned in said housing in the path of the swirling movement of the fluid and arranged so that its rotation represents the flow volume through said housing, said wall means forming a closed inlet channel into said inlet part, characterized in that the distance $R_i$ from the center line of said inlet channel to the axis of said outlet part is defined by the formula:

$0.75(w/2 + 2r_b + r_d) < R_i < 1.25(w/2 + 2r_b + r_d)$ where $w$ is the width of said inlet channel, $r_d$ is the smallest radius of said outlet part, and $r_b$ is the radius of said rotary body when said rotary body is in the form of a ball.

2. Transducer according to claim 1, characterised in that said distance $R_i$ is defined by the formula:

$0.9(w/2 + 2r_b + r_d) < R_i < 1.1(w/2 + 2r_b + r_d)$.

3. Transducer according to claim 2, characterised in that the ratio between the height $h$ of the inlet part and the radius $r_d$ of the outlet part is defined by the formula:

$0.4 < (r_d/h) < 1.4$.

4. Transducer according to claim 3, characterised in that said ratio is defined by the formula:

$0.8 < (r_d/h) < 1.2$.

5. Transducer according to claim 7, characterized in that said inlet part comprises an outer annular chamber arranged in direct communication with said inlet channel and a central chamber located radially inwardly of said annular chamber, said rotary body is arranged in said central chamber, and wall means separating said annular chamber and said central chamber and said wall means forming a plurality of channels communicating between said annular chamber and said central chamber.

6. Transducer according to claim 5, characterised in that said channels comprise a first part extending inwardly from said annular chamber having a cross-sectional area decreasing in the flow direction and a second cylindrically-shaped part communicating between said first part and said central chamber and the length of said second part being less than its diameter.

7. Transducer according to claim 2, characterised in that said housing includes two said outlet parts spaced apart by and in coaxial arrangement with said inlet part, and said rotary body is positioned in said inlet part.

8. Transducer according to claim 2, characterised in that said rotary body consists of a ball, the lateral inner surface of said intermediate piece has an annular groove formed therein, a central post centrally arranged within said intermediate piece and having an annular groove formed therein arranged opposite the annular groove in the inner lateral surface of said intermediate piece, said ball being mounted for rotation between said annular grooves in said intermediate piece and said post.

9. Transducer according to claim 1, characterized in that said rotary body is a ball, said housing forming a pair of oppositely disposed annular-shaped grooves disposed concentrically relative to the central axis of said inlet part, said ball arranged to rotate in the track formed by said annular grooves, and each said groove having a cross-sectional shape comprising a pair of circular arcs spaced apart by an intermediate straight section.

10. Transducer according to claim 9, characterised in that the distance $R_i$ from the centre line of the inlet channel (106) to the centre of the outlet part (103) is defined by the formulas:

$R_i > 0.75(w/2 + r_b + \Delta R_b + t/2 + r_m + r_d + \Delta R)$
$R_i < 1.25(w/2 + r_b + \Delta R_b + t/2 + r_m + r_d + \Delta R)$ where $\Delta R_b$ is the displacement of the centre of the ball from the centre of the groove to one or other of the two stable positions for rotation, $t$ is the total width of the ball groove, $r_m$ is the radius of curvature of the edge between the ball groove and the axially running outlet channel for the fluid and $\Delta R$ is the slight clearance necessary between the ball and the helical side wall of the inlet part where the radius is least.

11. Transducer according to claim 10, characterised in that said distance $R_i$ is defined by the formulas:

$R_i > 0.9(w/2 + r_b + \Delta R_b + t/2 + r_m + r_m + r_d + \Delta R)$
$R_i < 1.1(w/2 + r_b + \Delta R_b + t/2 + r_m + r_d + \Delta R)$.

12. Transducer according to claim 1, characterized in that said inlet part has a side wall spaced radially outwardly from its central axis and said side wall is helically formed about said central axis.

13. Transducer according to claim 12, characterized in that said inlet part comprises a pair of spaced walls extending in parallel relationship and disposed transversely of the central axis of said inlet part, each of said walls having an annular groove concentric to the central axis of said inlet part, and said rotary body comprises a ball arranged to rotate in a path formed between said annular grooves.

14. Transducer according to claim 13, characterised in that the grooves are arranged immediately next to the outlet part.

15. Transducer according to claim 14, characterised in that the outlet part has a minimum cross-sectional area which is approximately equal to the cross-sectional area of the inlet channel.

16. Transducer according to claim 13, characterised in that each part of the annular groove has a cross section in the form of a circle arc having a larger radius than that of the ball.

17. Transducer according to claim 1, in which the rotary body consists of a shaft having at least two blades extending radially, characterised in that the ends of the shaft are journalled in needle bearings.

18. Transducer according to claim 1, in which said rotary body consists of a shaft having at least two blades extending radially therefrom, characterized therein by a fluid supply pipe, a conduit arranged between said fluid supply pipe and said rotary body so that the fluid flowing through said pipe into said conduit acts as a lubricant for the shaft of said rotary body.

19. Transducer according to claim 18, characterised in that the pipe (242) contains a filter (243).

20. Transducer according to claim 57, characterized in that the outlet part has the shape of an elongated channel in coaxial relationship with said inlet part, and said means located within said outlet part for converting the kinetic energy in the swirling movement of the fluid into pressure energy and said means comprising at least four angularly spaced guide vanes.

21. Transducer according to claim 20, characterized in that said outlet part has an enlarged diameter section spaced from said inlet part and said guide vanes are arranged within said enlarged section.

22. Transducer according to claim 21, characterized in that said outlet part extends downwardly from said inlet part, said guide vanes extend in the axial direction of said outlet part and are curved in the axial direction, the upper part of said guide vanes are arranged approximately parallel to the flow direction of the fluid passing downwardly into said outlet part from said inlet part, and the lower part of said guide vanes are arranged approximately parallel to the axial direction of said outlet part.

23. Transducer for a flow gauge, comprising a housing, said housing comprising an inlet part having a central axis, wall means connected to said inlet part and spaced radially outwardly from the central axis and forming an inlet channel for introducing fluid tangentially into said inlet part so that a swirling action is commenced therein, said inlet part arranged to maintain the swirling action of the fluid introduced to said wall means, an outlet part in fluid communication with said inlet part, said outlet part having a central axis disposed in axial alignment with the central axis of said inlet part, said outlet part arranged to maintain the swirling action of the fluid commenced and maintained in said inlet part, a rotary body positioned in said housing in the path of the swirling movement of the fluid and arranged so that its rotation represents the flow volume through said housing, characterized therein that means are located within said outlet part spaced from the point at which it receives the swirling fluid from said inlet part for converting the kinetic energy in the swirling movement of the fluid into pressure energy, said inlet part comprising an outer annular chamber arranged in direct communication with said inlet channel and a central chamber located radially inwardly of said annular chamber, said rotary body is arranged in said central chamber, wall means separating said annular chamber and said central chamber and said wall means forming a plurality of channels communicating between said annular chamber and said central chamber, said plurality of channels comprise a first part extending inwardly from said annular chamber having a cross-sectional area decreasing in the flow direction and a second cylindrically-shaped part communicating between said first part and said central chamber and the length of said second part being less than its diameter.

24. Transducer for a flow gauge, comprising a housing, said housing comprising an inlet part having a central axis, wall means connected to said inlet part and spaced radially outwardly from the central axis for introducing fluid tangentially into said inlet part so that a swirling action is commenced therein, said inlet part arranged to maintain the swirling action of the fluid introduced through said wall means, an outlet part in fluid communication with said inlet part, said outlet part having a central axis disposed in axial alignment with the central axis of said inlet part, said outlet part arranged to maintain the swirling action of the fluid commenced and maintained in said inlet part, a rotary body positioned in said housing in the path of the swirling movement of the fluid and arranged so that its rotation represents the flow volume through said housing, characterized therein that means are located within said outlet part spaced from the point at which it receives the swirling fluid from said inlet part for converting the kinetic energy in the swirling movement of the fluid into pressure energy, said housing includes two said outlet parts spaced apart by and in co-axial arrangement with said inlet part, and said rotary body is positioned in said inlet part.

25. Transducer for a flow gauge, comprising a housing, said housing comprising an inlet part having a central axis, wall means connected to said inlet part spaced radially outwardly from the central axis for introducing fluid tangentially into said inlet part so that a swirling is commenced therein, said inlet part arranged to maintain the swirling action of the fluid introduced through said wall means, an outlet part in fluid communication with said inlet part, said outlet part having a central axis disposed in axial alignment with the central axis of said inlet part, said outlet part arranged to maintain the swirling action of the fluid commenced and maintained in said inlet part, a rotary body positioned in said housing in the path of the swirling movement of the fluid and arranged so that its rotation represents the flow volume through said housing, characterized therein that means are located within said outlet part spaced from the point at which it receives the swirling fluid from said inlet part for converting the kinetic energy in the swirling movement of the fluid into pressure energy, an intermediate piece forming a laterally closed passageway is arranged between and is coaxial with said inlet part and said outlet part, said rotary body is located within said intermediate piece, said inlet part and outlet part are constructed alike so that the flow through the transducer can be reversed and the transducer will retain its characteristic, said rotary consists of a ball, the lateral inner surface of said intermediate piece has an annular groove formed therein, a central post centrally arranged within said intermediate piece and having an annular groove formed therein arranged opposite the annular groove in the inner lateral surface of said intermediate piece, and said ball being mounted for rotation between said annular grooves in said intermediate and said post.

26. Transducer for a flow gauge, comprising a housing, said housing comprising an inlet part having a central axis, wall means connected to said inlet part and spaced radially outwardly from the central axis for introducing fluid tangentially into said inlet part so that a swirling action is commenced therein, said inlet part arranged to maintain the swirling action of the fluid introduced to said wall means, an outlet part in fluid communication with said inlet part, said outlet part having a central axis disposed in axial alignment with the central axis of said inlet part, said outlet part arranged to maintain the swirling action of the fluid commenced and maintained in said inlet part, a rotary body positioned in said housing in the path of the swirling movement of the fluid and arranged so that its rotation represents the flow volume through said housing, characterized therein that means are located within said outlet part spaced from the point at which it receives the swirling fluid from said inlet part for converting the kinetic energy in the swirling movement of the fluid into pressure energy, the outlet part has the shape of an elongated channel in co-axial relationship with said inlet part, and said means located within said outlet part comprises at least four angularly spaced guide means.

27. Transducer according to claim 26, characterized in that said outlet part has an enlarged diameter section spaced from said inlet part and said guide vanes are arranged within said enlarged section.

28. Transducer according to claim 27, characterized in that said outlet part extends downwardly from said inlet part, said guide vanes extend in the axial direction of said outlet part and are curved in the axial direction, the upper part of said guide vanes are arranged approximately parallel to the flow direction of the fluid passing downwardly into said outlet part from said inlet part, and the lower part of said guide vanes are arranged approximately parallel to the axial direction of said outlet part.

* * * * *